United States Patent [19]

Shorr et al.

[11] Patent Number: 4,980,390

[45] Date of Patent: Dec. 25, 1990

[54] METHOD OF MIXING COMPOSITE FILLED THERMOPLASTIC RESINS

[75] Inventors: Norman Shorr, Pittsburgh; Clarence Wright, Houston, both of Pa.

[73] Assignee: Ralph B. Andy, Washington, Pa.

[21] Appl. No.: 462,901

[22] Filed: Oct. 23, 1989

Related U.S. Application Data

[62] Division of Ser. No. 262,043, Oct. 24, 1988, abandoned, which is a division of Ser. No. 75,600, Jul. 20, 1987, abandoned.

[51] Int. Cl.$^5$ ............................ C08K 3/26; C08K 3/00
[52] U.S. Cl. .......................................... 523/1; 264/140; 264/142; 524/427; 524/577; 524/584; 524/586; 528/481; 528/502; 528/503
[58] Field of Search ..................... 523/1; 528/502, 503, 528/481; 524/427, 577, 584, 586; 264/142, 140

[56] References Cited

U.S. PATENT DOCUMENTS

| | | | |
|---|---|---|---|
| 3,981,840 | 9/1976 | Yamamoto et al. | 524/584 |
| 4,144,302 | 3/1979 | Calkins | 264/142 |
| 4,303,757 | 12/1981 | Kajimura et al. | 521/139 |
| 4,455,344 | 6/1984 | Matsuyama et al. | 428/520 |
| 4,618,527 | 10/1986 | Doyen | 428/520 |
| 4,774,044 | 9/1988 | Clin et al. | 524/412 |

*Primary Examiner*—Herbert J. Lilling
*Attorney, Agent, or Firm*—William J. Ruano

[57] ABSTRACT

A method of mixing filled thermoplastic resins containing particles of resin and filler. The method comprises preheating to about 150 degrees to 250 degrees F., at least the resin particles, and thereafter mixing until plasticized. The filler may also be preheated between 150 degrees and 350 degrees F. This method reduces the mixing time and improves the characteristics of the product.

1 Claim, 1 Drawing Sheet

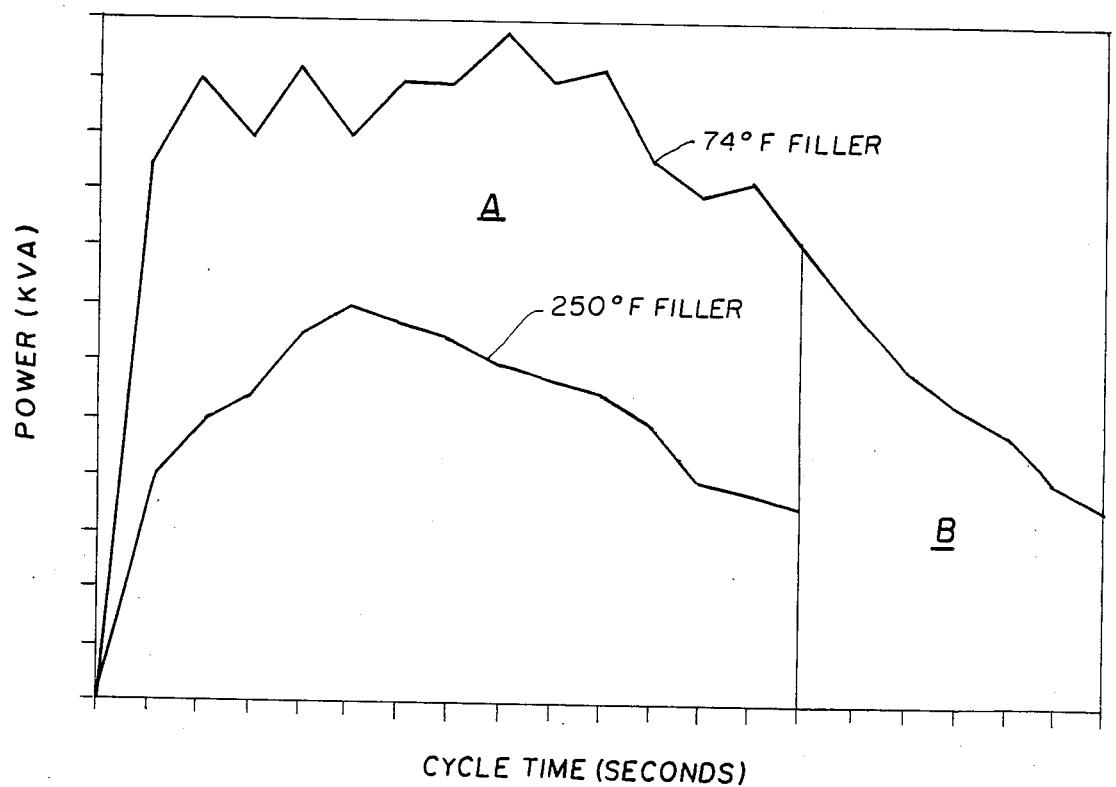

METHOD OF MIXING COMPOSITE FILLED THERMOPLASTIC RESINS

This application is a division of application Ser. No. 07/262,043 filed 10,24,88, which is a division of application Ser. No. 07/075,600 filed July 20, 1987, both abandoned.

BACKGROUND OF THE INVENTION

Mixer compounding of filled thermoplastic resins is, in general, a process of filling a mixing chamber with combinations of (a) solid resins in pellet or flake form, (b) solid fillers in pellet, powder, or flake form, and (c) low percentage level additives, also generally in powder or flake form then operating the mixing equipment in a technically sound manner to complete a planned production time cycle or a planned production rate.

Compounding of the above components into a useful product mix is effected by first, developing high, intensive shear frictional heat energy as the dry, feedstock ingredients abrade, grind, and impinge upon each other and the metallic surfaces of the equipment during the initial early or cold phase of the mixing cycle. The high frictional heat energy, so impressed into the mix, initiates transformation of the solid resin or resins and any other organic additives into a viscous plastic mass. The on-going mixing also begins dispersion of the unmelted mineral fillers throughout the mix. Further mixing continues to develop additional frictional heat, reducing the mass viscosity even more and increasing both the dispersion and distribution of the compounded ingredients. Eventually, a hot, homogeneous plastic mass is produced, available for and capable of further processing, thus completing the mixing phase of the compounding process.

The above described general mixing process has several major deficiencies relative to (a) optimum production efficiency, (b) optimum product quality and strength, and (c) optimum cost effectiveness. The deficiencies of said process are listed herewith:

For purposes of analysis and understanding of this invention, the hereinafter paragraph numbers 1A, 2A, 3A, 4A, and 5A can be coordinated with numbers 1B, 2B, 3B, 4B, and 5B; and with numbers 1C, 2C, 3C, 4C, and 5C.

1A. Fairly long production time cycles in batch mixing and lower production rates in continuous mixing.

2A Difficulty of maintaining standard time cycles or production rates during seasonal temperature and environmental changes 3A Reduction in a compounded product's quality and strength when compared to its full potential product quality and strength because of attendant filler damage during compounding, especially to its "aspect ratio", defined later.

4A. Potentially higher product manufacturing costs (associated with item 3A above) as higher quality and more expensive resin and filler feedstocks may be required to compensate for weaknesses related to said filler damage.

5A Excessive wear on compounding equipment blades, screws, barrels, walls, etc.

SUMMARY OF THE INVENTION

The object of this invention is the utilization of externally preheated feedstock materials, raised to sufficiently high temperatures, which, while within the respective safety and handling limits of said materials, provide the significant thermal energy inputs required to effect a near immediate development of plasticity and quick reduction in mass viscosity. It is this input of high thermal energy into the mixing process at its very onset which precludes the necessity for very high intensive shear frictional heat energy to develop the plasticity and which provides most significant reductions in batch production time cycles, increases in continuous mixing production rates, improvements in product quality and strength, reductions in product manufacturing costs, and reduction in equipment obsolescence and wear.

Additionally, the thermal energy costs of this externally preheated materials system are, at the least, washed out and counterbalanced by reduction in both the processing electrical energy requirements and in peak electrical energy demands.

BRIEF DESCRIPTION OF THE DRAWING

FIG. 1 of the drawing is a graph showing a comparison between an unheated and preheated filler in accordance with the invention.

DETAILED DESCRIPTION OF THE INVENTION

The following is a comparison of a standard operation utilizing a high-shear intensive mixer as the major equipment component in a typical mixer compounding process.

1B. The mixing time cycle for completion of a certain typical batch size of one of the commercial mineral-filled/polyolefin resin products is fairly long.

2B. The typical mixing time cycle referenced above is still subject, however, to variability created by both temperature and moisture variances in the major feedstock ingredients; specifically, the resins and fillers For example, during the winter months with feedstocks at colder temperatures and with included condensed and absorbed surface moisture, additional high intensive shear mixing over and above the usual time frame is required to both boil off the attendant additional moisture and to raise the colder feedstock material to the proper processing temperatures. For example, during the winter, "cold" mineral fillers, such as talc, calcuim carbonate, etc at perhaps 20–30 Fahrenheit degrees below the usual standard year round temperature conditions require additional mixing time, approximately 15-20% longer It must be mentioned that this additional cycle time is critical since any remaining moisture in the compounded batch increases the barrier surface area between the non-polar resins and the generally polar mineral fillers, decreasing the desired optimum mechanical bond strength and therefore, the physical and thermal properties. Some of the largest commercial applications of compounded mineral filled thermoplastic resins are in the automotive, electronic, other industrial, and household appliance fields. It is well known that the physical and thermal properties of said filled thermolpastic resins are, to a great degree, a function of the physical properties of the incorporated mineral fillers. One of the key mineral filler properties related to its capability for resin reinforcement and for development of high product strength is its "aspect ratio", defined as the ratio of a particle diameter to its thickness. This property represents not only its condition of "platyness", or its capability to flatten and assemble itself against the next particle, but even more, its capability of developing high rigidity in the fabricated product It can be seen that a mass of flat, molded mineral "plates" interspersed with resin layers will have greater rigidity if aspect ratios of the mineral "plates" are high. This is usually evidenced by much higher flexural moduli, tensile yield strengths, and heat deflection temperatures than those molded products having fillers which are either non-platy (acicular or spherical) or whose aspect ratios are lower than the above-described high aspect ratio product.

3B. The basic problem with filler particle aspect ratios, however, is that said aspect ratios are constantly being decreased by any and all process treatments which can apply sufficient pressures to produce filler particle breakage Since practically all mixing equipment creates particle damage almost entirely in its diameter and only negligibly in its thickness, the aspect ratio continues to decrease as processing proceeds. For example, if one assigns an aspect ratio of V to the filler when received as feedstock by a mixer compounder, then the aspect ratio is decreased greatly when the mineral experiences the high initial frictional shear pressure fraction of the mixing cycle (when dry materials are grinding on each other and on the hardened metal surfaces). The new aspect ratio of the filler at the end of this high friction phase can be designated as W: continued mixing to completion of the mixing cycle, although at reduced intensive shear rates still produces an even lower aspect ratio, designated as X. If the compounded mass mix is then additionally processed as through an extruder for stranding purposes, more damage is done to the aspect ratio, now down to a designation of Y. The final fabricator or molder, by utilizing an injection molding machine or sheet extruder will reduce the aspect ratio even further, to Z. It must be understood that the aspect ratios designated are in the following descending order.. V W X Y Z.

This entire litany of extents of filler aspect ratio degradation indicates that one key to filled resin product strength is to minimize particle damage, however and whenever possible, and to maintain the filler aspect ratio at its potential maximum.

4B. Since product quality and strength of the final product delivered to the customer are, among others, functions of the accumulated process damage to the filler aspect ratio, it is incumbent on the compounder to utilize the proper and necessary feedstock materials both resins and fillers, of sufficiently high enough quality (which automatically means high enough cost) which, after all compounding and final fabrications are completed, provide a product meeting the customer's requirements 5B. During the initial mix compounding operations, the feedstock materials are, for all practical purposes, dry solids. High shear frictional pressures are exerted immediately on these solids, with dry materials grinding not only on each other but also against all of the metallic equipment contact surfaces At this initial period prior to plasticity and before the lubricating value of the viscous resin and the melted internal lubricants can be brought to bear fully on the metallic equipment surfaces, abrasion and wear on said surfaces are the greatest This is a leading factor in equipment wear, especially rapid in cases where high MOH hardness number materials, such as titanium dioxide or chopped fiberglass are employed as fillers.

The crux of this invention (as noted hereinabove) is applicable to all of the present, generally recognized compounding technologies and equipment-examples of which, but not limited to these, are high shear intensive batch mixing, high intensity continuous mixing, single screw extrusion, multi-screw extrusion, multi-rotor extrusion, etc.

For the purpose of explanation and illustration of the invention to those skilled in the art, however, high shear intensive mixer operation is utilized.

THE PRESENT INVENTION

The pre-heated materials system utilizing a high shear intensive mixer as the major equipment component produces the following novel and most practical improvements in the state of the art:

1C. When externally pre-heated fillers at around 250-350 degrees F. and, additionally pre-heated resins at temperatures below their "sticking points", approximately 200-250 degrees F. are introduced into the mix compounding chamber, some plasticity of the resin is achieved almost immediately. The need for the high thermal energy development by frictional heat build-up is reduced radically, and the additional mixing time produces the required dispersion and distribution of the ingredients to achieve homogeneity but, all in a much shorter time Batch cycle time is reduced from a typical standard time cycle and as high as 20 percent longer under referenced conditions to a time cycle 30 to 40 percent shorter than the typical standard time cycle under indentical conditions.

2C. To eliminate high shear intensive mixing time cycle variability created by variances in feedstock temperature and moisture levels, the pre-heating of the materials to a set, standard temperature not only guarantees replication of the mixing quality but also shifts the mixing time cycle to the lower end of the working range. In other words, reduced time cycles of up to 50% or even better are obtainable under these conditions. Additionally, certainty of removal of the absorbed moisture assures a superior resin-filler intimacy of contact because of the minimized moisture barrier surface, thus assuring superior product strength.

3C. It has been emphasized in the standard operation that reduced aspect ratios are deleterious to filled resin composite strength. In our system, the nearly immediate plasticity of the compounding batch not only minimized the need for the high frictional shear pressures which heavily damage the fillers but provides the needed protection to the filler by very quickly enabling the filler particles to become resin-enveloped, thus providing the lubrication to hold damage to a minimum. Additionally, as previously mentioned, the reduced mixing cycle time means that the exposure time to potential filler mixing damage, under any conditions, is substantially reduced 4C. The following should be noted with respect to production costs. In the standard operation, feedstock quality must be of such a high order that after all compounding and final fabrication processing work is completed, the product meets customer requirements. In the case of our new process, both the reduced feedstock material damage and reduced total production cycle times enable us to utilize resin and filler feedstocks of lower quality and cost, which, under the referenced reduced stresses and time will still match customer requirements. Alternatively, use of identical quality feedstocks as in the standard operation, produce products of superior quality and strength 5C. With respect to equipment obsolescence and wear, elimination of the initial, high intensity shear pressures from the system eliminates that portion of the mixing cycle where the greatest wear potential on the equipment is produced. In our process, savings are twofold:

1. It requires a much longer period of time for clearances between rotating and stationary parts of the equipment to become significant and create production problems.

2. It requires an even much longer time to reach wear levels of such magnitude as to necessitate equipment shut downs for repair. With high MOH hardness fillers especially, many of which are used in pigment concentrates, this feature is extremely critical.

Included in this writing are the drawings which relate not only to the thermal energy input counterbalances but also to the previously discussed filler damage and machine wear factors. The FIG. 1 of the drawing shows a comparison between an unheated filler and a preheated one. A dramatic reduction in both total energy and peak energy usage is evident. Additionally, the mixing time cycle of the preheated filler is approximately 70% of the mixing time cycle of the unheated filler.

It is the savings in electrical energy between the two machine operations which counter balances the cost of the additional thermal energy required to pre-heat the feedstock materials.

It is also obvious that lower energy inputs on the fillers, and for a shorter time period, will result in both less filler damage (higher aspect ratios) and reduced metal-plastic friction coefficients (less machine wear).

A shows energy savings from peak demand differences, and B, from shorter time cycle. Total energy savings = A + B.

Additionally, use of very fine filler particles may provide specially desired physical properties to certain resin-filler composites. Said fillers, which are very fluffy, are extremely difficult to process since they resist the mixing equipment's capability of compounding the fluffy filler into the resin.

In our invention, the near immediate tacky resin during the initial compounding phase causes these fine filler particles to adhere to said resin for a sufficient length of time to enable the mixing blades to "take hold" of the batch material and effectively proceed with and control the compounding process to completion.

While polyethylene, polypropylene, polystyrene, etc. have been described, the invention is applicable also to higher temperature engineering resins which may require compounding at 400°–500° F.

Another modification is to heat the resin to about 100 Fahrenheit degrees below its plasticity temperature and/or heat the filler to about 100 Fahrenheit degrees above the plasticity temperature of the final compounded batch.

Thus it will be seen that we have provided a novel and highly efficient method of mixing a resin and filler comprising preheating either the resin or filler or both before mixing to temperatures up to about 300° F., which method also improves the characteristics of the finished product.

While we have illustrated and described several embodiments of our invention, it will be understood that these are by way of illustration only and that various changes and modifications may be contemplated in our invention and within the scope of the following claims:

We claim:

1. The method of producing molding pellets comprising mixing filled thermophastic resins containing particles of resin and filler for the purpose of reducing mixing time and improving the characteristics of the final product comprising preheating only the filler particles to about 150 to 250 degrees F., and thereafter mixing the resin and filler particles and pelletizing to form pellets as the final product.

* * * * *